(12) United States Patent
Esbelin et al.

(10) Patent No.: US 9,382,375 B2
(45) Date of Patent: *Jul. 5, 2016

(54) CURABLE POLYISOCYANATE COMPOSITION

(71) Applicant: Huntsman International LLC, The Woodlands, TX (US)

(72) Inventors: Christian Esbelin, Schaerbeek (BE); Hugo Verbeke, Leuven (BE); Hans Godelieve Guido Verbeke, Lubbeek (BE)

(73) Assignee: Huntsman International LLC, The Woodlands, TX (US)

( * ) Notice: Subject to any disclaimer, the term of this patent is extended or adjusted under 35 U.S.C. 154(b) by 19 days.

This patent is subject to a terminal disclaimer.

(21) Appl. No.: 14/367,954

(22) PCT Filed: Nov. 30, 2012

(86) PCT No.: PCT/EP2012/074048
§ 371 (c)(1),
(2) Date: Jun. 23, 2014

(87) PCT Pub. No.: WO2013/098034
PCT Pub. Date: Jul. 4, 2013

(65) Prior Publication Data
US 2014/0371406 A1    Dec. 18, 2014

(30) Foreign Application Priority Data
Dec. 28, 2011    (EP) .................................. 11195897

(51) Int. Cl.
    *C08L 63/00*       (2006.01)
    *C08G 18/00*       (2006.01)
(Continued)

(52) U.S. Cl.
CPC .......... *C08G 59/4028* (2013.01); *C08G 18/003* (2013.01); *C08G 18/225* (2013.01); *C08G 18/2865* (2013.01); *C08G 18/3825* (2013.01); *C08G 18/3829* (2013.01);
(Continued)

(58) Field of Classification Search
CPC .................................................. C08G 59/4028
USPC ........................................................ 525/528
See application file for complete search history.

(56) References Cited

U.S. PATENT DOCUMENTS 3,517,039 A    6/1970   Kuno et al.
3,660,456 A    5/1972   Naito et al.
(Continued)

FOREIGN PATENT DOCUMENTS

EP    0 477 093     3/1991
EP    0 585 835     8/1993
(Continued)

OTHER PUBLICATIONS

Sheth, Jignesh P. et al.. Polymer 45, pp. 5979-5984 (2004).
(Continued)

*Primary Examiner* — David Karst
(74) *Attorney, Agent, or Firm* — Robert A. Diaz (57) ABSTRACT

Stable polyisocyanate composition comprising a compound comprising a group having the structure —CO—NH—O— in such an amount that the ratio of the number of —CO—NH—CO— groups to the number of isocyanate groups is at most equal to 1. Curable composition comprising this polyisocyanate composition, lithium halide, urea and an epoxy resin.

18 Claims, 3 Drawing Sheets

(51) Int. Cl.

| | | |
|---|---|---|
| *C08G 59/40* | (2006.01) | |
| *C08G 18/48* | (2006.01) | |
| *C08G 18/58* | (2006.01) | |
| *C08G 18/79* | (2006.01) | |
| *C08G 18/22* | (2006.01) | |
| *C08G 18/38* | (2006.01) | |
| *C08L 75/00* | (2006.01) | |
| *C08G 18/66* | (2006.01) | |
| *C08G 18/78* | (2006.01) | |
| *C08G 18/28* | (2006.01) | |
| *C08K 3/00* | (2006.01) | |
| *C08K 3/16* | (2006.01) | |
| *C08K 5/21* | (2006.01) | |

(52) U.S. Cl.
CPC ....... *C08G 18/3846* (2013.01); *C08G 18/4829* (2013.01); *C08G 18/58* (2013.01); *C08G 18/6685* (2013.01); *C08G 18/7825* (2013.01); *C08G 18/797* (2013.01); *C08G 59/4021* (2013.01); *C08L 75/00* (2013.01); *C08G 2105/02* (2013.01); *C08K 3/0083* (2013.01); *C08K 3/16* (2013.01); *C08K 5/21* (2013.01)

(56) References Cited

U.S. PATENT DOCUMENTS

| | | |
|---|---|---|
| 3,799,963 A | 3/1974 | Adams |
| 3,970,600 A | 7/1976 | Falkenstein et al. |
| 4,284,730 A | 8/1981 | Narayan et al. |
| 4,302,351 A | 11/1981 | Gras et al. |
| 4,330,656 A | 5/1982 | Groegler et al. |
| 4,331,810 A | 5/1982 | Christman et al. |
| 4,371,544 A | 2/1983 | Fujimura et al. |
| 4,537,961 A | 8/1985 | Robin |
| 4,658,007 A | 4/1987 | Marks et al. |
| 4,697,014 A | 9/1987 | Robin |
| 4,743,627 A | 5/1988 | Narayan et al. |
| 5,086,150 A | 2/1992 | Frauendorf et al. |
| 5,124,370 A | 6/1992 | Scholl et al. |
| 5,221,743 A | 6/1993 | Goldstein et al. |
| 5,326,833 A | 7/1994 | Parodi et al. |
| 5,817,732 A | 10/1998 | Asahina et al. |
| 6,127,308 A | 10/2000 | Slack et al. |
| 6,613,863 B2 | 9/2003 | Kohlstruk et al. |
| 6,875,243 B2 | 4/2005 | Ewald et al. |
| 7,071,353 B2 | 7/2006 | Gurtler et al. |
| 7,553,963 B2 | 6/2009 | Slack et al. |
| 2003/0134971 A1 | 7/2003 | Blount |
| 2010/0022707 A1 | 1/2010 | Schaefer et al. |

FOREIGN PATENT DOCUMENTS

| | | |
|---|---|---|
| EP | 1 0851030 | 7/2000 |
| GB | 701 549 | 12/1953 |
| GB | 1 463 809 | 2/1977 |
| JP | 2 110123 | 4/1990 |
| WO | 2008/060545 | 5/2008 |
| WO | 2008/068198 | 6/2008 |
| WO | 2010/121898 | 10/2010 |

OTHER PUBLICATIONS

Pankratov, V.A. et al., Russian Chemical Reviews, 52 (6), pp. 576-593 (1983).

Yang, Juan et al., Journal of East China University of Science and Technology, vol. 32 No. 11, pp. 1293-1296 (2006).

Woods, The ICI Polyurethanes Book, 2nd edition, pp. 32-35 (1990).

CURABLE POLYISOCYANATE COMPOSITION

This application is the National Phase of International Application PCT/EP2012/074048 filed Nov. 30, 2012 which designated the U.S. and which claims priority to Foreign Application No. 11195897.1 filed Dec. 28, 2011. The noted applications are incorporated herein by reference.

The present invention relates to a stable polyisocyanate composition, to a process for making such a composition, to a curable composition wherein the stable polyisocyanate composition according to the present invention is used, to a process for making such curable composition, to a polyisocyanurate material made or obtainable from such curable composition and to a process for making such polyisocyanurate materials.

Recently a curable composition has been proposed which comprises a polyisocyanate, a lithium halide, a urea compound and an epoxy resin; see PCT/EP2010/054492.

The use of lithium chloride and compounds comprising urea groups has been disclosed by Sheth, Aneja and Wilkes in Polymer 45 (2004) 5979-5984. They studied the influence of the extent of hydrogen bonding in mediating the long-range connectivity and percolation of the hard segment phase in model tri-segment oligomeric polyurethanes using LiCl as a molecular probe.

In U.S. Pat. No. 5,086,150 an isocyanate-terminated prepolymer is reacted with a diamine in the presence of a rather high amount of LiCl to prepare an elastomer solution which is stable for at least two days. At the beginning of the reaction the number of moles of lithium chloride per isocyanate equivalent is rather high; the lithium chloride is used to act as a solubilizer. At the beginning of the reaction, the composition is not stable and does not contain urea and at the end of the reaction it is an elastomer and not an isocyanate composition anymore. The product obtained is an elastomer solution used for making threads and films.

The polyisocyanate composition according to the present invention is very suitable to make a curable composition together with epoxy compounds.

The use of isocyanates and epoxides together with LiCl has been disclosed in Russian Chemical Reviews 52(6) 1983, 576-593. The reaction is influenced by the nature of the catalyst. In the presence of metal halides an activated complex is formed which ultimately gives an oxazolidone. One of the side reactions is the formation of isocyanurate rings which decompose to oxazolidone on treatment with epoxides. Further it has been disclosed therein that epoxides are capable of cleaving urea linkages with formation of oxazolidones.

U.S. Pat. No. 4,658,007 discloses a process for preparing oxazolidone containing polymer using organoantimony iodide catalyst by reacting a polyisocyanate and a polyepoxide.

U.S. Pat. No. 5,326,833 discloses a composition comprising a polyisocyanate, an epoxide and a catalyst consisting of a solution of an alkali halide, like LiCl, in a polyoxyalkylenic compound. These compositions are able to gel rapidly between 0° C. and 70° C.

Juan et al discuss in the Journal of East China University of Science and Technology Vol. 32, No 11, 2006, 1293-1294 the influence of LiCl on the morphology structure and properties of polyurethane-urea. It shows that the viscosity of polyurethane urea solutions first decreases and subsequently increases. The polyurethane urea was made by reacting polyepoxypropane glycol and isophorone diisocyanate with excess polyisocyanate.

In U.S. Pat. No. 3,517,039 acylated urea polyisocyanates are made by reacting an organic diisocyanate with an organic monocarboxylic acid. These polyisocyanates are used in the preparation of polyurethanes, especially when small amounts of branching are desirable.

In U.S. Pat. No. 3,970,600 stable solutions of isocyanurate-polyisocyanates containing amide and/or acylurea groups have been described. They avoid deposition of fine or coarse crystalline solids in polyisocyanates comprising isocyanurate groups. First a polyisocyanate is reacted with polybasic carboxylic acid to prepare a polyisocyanate with amide and/or—substituted—acylurea groups. Then this polyisocyanate is trimerized to form an isocyanurate-polyisocyanate and this conversion is stopped by adding acid.

In JP 2-110123 an aliphatic diisocyanate is trimerized to prepare polyisocyanates which have an isocyanurate structure using a catalyst and a deactivating agent once the desired degree of conversion has been attained. The deactivating agent has the structure —CO—$NH_2$ or —SO—$NH_2$ and may be urea, methyl urea, 1,1-dimethyl urea, phenyl carbamate, ethylcarbamate or butylcarbamate. Subsequently deactivated catalyst, excess diisocyanate and solvent, if used, are eliminated. By using this deactivating agent the polyisocyanate comprising polyisocyanurate structure shows a lower degree of discolouration.

WO 2008/068198 and US 2010/0022707 disclose a process for preparing an oligomerized polyisocyanate using a catalyst wherein a deactivator is used once the desired conversion has been obtained followed by removal of the polyisocyanate which was not converted. The deactivator may be selected from urea and urea containing compounds, amongst others.

EP 585835 discloses a process for preparing isocyanurate and urethane group containing polyisocyanate mixtures by partially cyclizing diisocyanates in the presence of a trimerization catalyst, deactivating the trimerization catalyst when the desired conversion is achieved, and subsequently reacting the resulting isocyanurate group containing polyisocyanate with hydroxyl compounds and then separating off the monomeric diisocyanate.

Further disclosures related to partially trimerized polyisocyanate compositions using different methods to stop the trimerization are: EP 447093, U.S. Pat. Nos. 4,284,730, 4,537,961, 4,697,014, 4,743,627, 5,124,370, 5,221,743 and 7,553,963. None of these disclosures reveal the present invention or point into its direction.

In U.S. Pat. No. 7,071,353 reaction products of isocyanates and carboxylic acids are disclosed. First amides are formed which then form acylureas by reaction with further isocyanate groups. U.S. Pat. No. 4,371,544 discloses the reaction product of phenylisocyanate and 1-ethyl, 1-methyl urea.

Thermally activated PIR catalysis has been disclosed in U.S. Pat. No. 6,127,308.

Urea and amides have been disclosed as blocking agents in U.S. Pat. No. 5,817,732.

U.S. Pat. No. 4,302,351 discloses isocyanurates and acid hydrogen containing blocking agents.

In GB 1463809 mono-substituted ureas and in U.S. Pat. No. 4,330,656 N-methylurea have been used as catalyst.

Choline type catalysts have been disclosed in EP 1085030, U.S. Pat. Nos. 6,613,863 and 6,875,243.

Surprisingly we have found a polyisocyanate composition comprising a compound having a —CO—NH—CO— group and which is stable and liquid at 20° C. and ambient pressure and which may be used in making a curable composition which is useful to make a polyisocyanurate material at elevated temperature and which has a long pot-life at 20° C. and ambient pressure.

Therefore the present invention is concerned with a stable polyisocyanate composition comprising a compound having a —CO—NH—CO— group which is suitable for making a curable composition. The compound having a —CO—NH—CO— group is an "imide-like" structure comprising 2 carbonyl groups attached to a —NH— group.

The compound having a —CO—NH—CO— group is present in such an amount that the ratio of —CO—NH—CO— groups over the number of isocyanate groups is at most 1, preferably at most 0.01, more preferably at most 0.0015.

According to an embodiment the compound having a —CO—NH—CO— group may be added to a polyisocyante composition in order to create the stable polyisocyanate composition according to the invention.

According to an embodiment the compound having a —CO—NH—CO— group may be a compound having an acylurea group having the structure —CO—NH—CO—NH—. Said compound having an acylurea group may be the reaction product of a polyisocyanate and a compound comprising a carboxamide group having the structure —CO—NH$_2$. However the compounds having an acylurea group according to the invention are not limited to reaction products of a compound comprising a carboxamide and a polyisocyanate.

Further the present invention is concerned with a process for preparing the above stable polyisocyanate composition which process comprises adding and mixing a compound comprising a —CO—NH—CO— group to a polyisocyanate composition. The final concentration of the compound comprising a —CO—NH—CO— group in the stable polyisocyanate composition is such that the ratio of —CO—NH—CO— groups over the number of isocyanate groups is at most 1, preferably at most 0.01, more preferably at most 0.0015.

In case the compound having a —CO—NH—CO— group is a compound having an acylurea group having the structure —CO—NH—CO—NH— and which is also a reaction product of a polyisocyanate and a compound comprising a carboxamide group having the structure —CO—NH$_2$, the compound having the carboxamide group having the structure —CO—NH$_2$ may be added (mixed) to the polyisocyanate composition and allowing the mixture to react, wherein the amount of the compound comprising the carboxamide group is such that after the reaction has been conducted the ratio of acylurea groups over the number of isocyanate groups is at most 1, preferably at most 0.01, more preferably at most 0.0015.

Still further the present invention is related to the use of the stable polyisocyanate composition according to the present invention for improving the pot-life of a curable polyisocyanate composition, to such curable polyisocyanate composition, to a process to make such curable polyisocyanate composition, to a polyisocyanurate material made from such curable polyisocyanate composition and to a process to make such polyisocyanurate material.

In the context of the present invention the following terms have the following meaning:

1) isocyanate index or NCO index or index:
    the ratio of NCO-groups over isocyanate-reactive hydrogen atoms present in a formulation, given as a percentage:
    [NCO]×100(%).
    [active hydrogen]
    In other words the NCO-index expresses the percentage of isocyanate actually used in a formulation with respect to the amount of isocyanate theoretically required for reacting with the amount of isocyanate-reactive hydrogen used in a formulation.
    It should be observed that the isocyanate index as used herein is considered from the point of view of the actual polymerisation process preparing the material involving the isocyanate ingredient and the isocyanate-reactive ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols or polyamines) are not taken into account in the calculation of the isocyanate index. Only the free isocyanate groups and the free isocyanate-reactive hydrogens (including those of water, if used) present at the actual polymerisation stage are taken into account.
2) The expression "isocyanate-reactive hydrogen atoms" as used herein for the purpose of calculating the isocyanate index refers to the total of active hydrogen atoms in hydroxyl and amine groups present in the reactive compositions; this means that for the purpose of calculating the isocyanate index at the actual polymerisation process one hydroxyl group is considered to comprise one reactive hydrogen, one primary amine group is considered to comprise one reactive hydrogen and one water molecule is considered to comprise two active hydrogens.
3) Reaction system: a combination of components wherein the polyisocyanates are kept in one or more containers separate from the isocyanate-reactive components.
4) The term "average nominal hydroxyl functionality" (or in short "functionality") is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.
5) The word "average" refers to number average unless indicated otherwise.
6) "Liquid" means having a viscosity of less than 10 Pa·s measured according to ASTM D445-11a at 20° C.
7) "Stable polyisocyanate composition" is a polyisocyanate composition according to the present invention which does not change more than 10% from its initial NCO value when kept at 80° C. and ambient pressure for 10 minutes, the NCO value being determined at ambient conditions. As an example: a polyisocyanate composition having an NCO value of 25% by weight should have an NCO value within the range 22.5-27.5% by weight after having been kept at 80° C. for 10 minutes in order to be regarded as stable, both NCO values being determined at ambient conditions The compounds having a —CO—NH—CO— group according to the invention corresponds to the formula R$_1$—CO—NH—CO—R$_2$ wherein R$_1$ and R$_2$ each independently from each other are selected from 1) hydrogen (—H), 2) —NR$_3$R$_4$, 3) hydrocarbyl having 1-100 carbon atoms and optionally comprising hydroxy, ether, halogen, carboxyl, oxygen, isocyanate and/or amine groups, wherein R$_3$ and R$_4$ independently from each other, are selected from hydrogen, hydroxy, halogen and hydrocarbyl groups which hydrocarbyl groups have 1-20 carbon atoms and optionally comprise hydroxy, ether, halogen, carboxyl, isocyanate and/or amine groups, wherein $R_1$ and $R_2$ may be linked to each other essentially forming a ring structure including the —CO—NH—CO— group, and wherein the hydrocarbyl groups in the compounds corresponding to the formula $R_1$—CO—NH—CO—$R_2$ may be a combination of linear, branched, saturated, unsaturated, cyclic and/or non-cyclic aliphatic, aromatic or araliphatic hydrocarbyls and mixtures of such compounds. Preferably the compound having a —CO—NH—CO— group according to the invention has a molecular weight of at most 1500.

In case $R_1$ and $R_2$ are linked to the —CO—NH—CO— group such that a ring structure is formed in the compound $R_1$—CO—NH—CO—$R_2$ then $R_1$ and $R_2$ together with the —CO—NH—CO— group may form a 4 to 12 membered ringstructure (in case of a 4 membered ring structure there is no $R_2$ involved). Examples of suitable compounds $R_1$—CO—NH—CO—$R_2$ having a ringstructure are:

(1)

Pyrrolidine-2,5-dione
(succinimide)

(2)

Piperidine-2,6-dione
(glutarimide)

(3)

8-azaspiro[4.5]decane-7,9-dione
(Tetramethylene glutarimide)

The ringstructure may comprise 1 or more unsaturations and/or optionally 1 or more aromatic rings and/or optionally rings with heteroatomes. Examples of suitable compounds $R_1$—CO—NH—CO—$R_2$ wherein $R_1$ and $R_2$ together with the —CO—NH—CO— group may form a 4 to 12 membered ring structure and comprise unsaturations, aromatic rings and/or heteroatomes are given below.

(4)

Iso indoline-1,3-
dione (Phthalimide)

(5)

1 H-benzo[de]
isoquinoline-
1,3(2H)-dione
(Naphtalimide)

(6)

2,5- pyrrole dione
(Maleimide)

(7)

5-nitro isoindoline-1,3-dione
(4 nitro phthalimide)

(8)

1H-pyrrolo[3,4-c]
pyridine-1,3(2H)-
dione(3,4 pyridine
dicarboxamide)

According to an embodiment, the compound having a —CO—NH—CO— group may be a compound having an acylurea group having the structure —CO—NH—CO—NH—. Said compound having an acylurea group according to the invention corresponds to the formula $R_6$—CO—NH—CO—NH—$R_7$ and may be the reaction product of a polyisocyanate comprising reactive NCO groups and corresponding to the formula $R_7$—NCO and a compound comprising a carboxamide group having the structure —CO—NH$_2$. and corresponding to the formula NH$_2$—CO—$R_6$.

The polyisocyanate compound comprising reactive NCO groups is corresponding to the formula $R_7$—NCO wherein $R_7$ may be selected from hydrogen and hydrocarbyl groups which hydrocarbyl groups have 1-20 carbon atoms and optionally comprise hydroxy, ether, halogen, carboxyl, isocyanate and/or amine groups and wherein said hydrocarbyl groups may be a combination of linear, branched, saturated, unsaturated, cyclic and/or non-cyclic aliphatic, aromatic or araliphatic hydrocarbyls and mixtures of such compounds.

The compound comprising the carboxamide, which compound may be used to make the compound comprising an acylurea group having the structure —CO—NH—CO—NH— according to the present invention, preferably is selected from a compound according to the formula NH$_2$—

CO—$R_6$ wherein $R_6$ is 1) hydrogen (—H), 2) —$NR_8R_9$, 3) hydrocarbyl having 1-20 carbon atoms and optionally comprising hydroxy, ether, halogen and/or amine groups, or 4) —$R_{10}$—CO—$NH_2$, wherein $R_8$ and $R_9$, independently from each other, are selected from hydrogen, hydroxy, halogen and hydrocarbyl groups which hydrocarbyl groups have 1-10 carbon atoms and optionally comprise hydroxy, ether, halogen and/or amine groups and wherein $R_{10}$ is a bivalent hydrocarbon radical having up to 8 carbon atoms. Mixtures of these carboxamides may be used as well. Preferably such carboxamides have a molecular weight of at most 499.

The hydrocarbyl groups in these carboxamides may be linear or branched, saturated or unsaturated and cyclic or non-cyclic; they may be aliphatic, aromatic or araliphatic.

More preferred carboxamides are those wherein $R_6$ is 1) —$NR_8R_9$, 2) alkyl having 1-10 carbon atoms and optionally comprising 1-3 hydroxy and/or ether groups, 3) phenyl or 4) tolyl, wherein $R_8$ and $R_9$, independently from each other, are selected from hydrogen, hydroxy, phenyl, tolyl and alkyl having 1-6 carbon atoms and optionally comprising an hydroxy and/or an ether group. Mixtures of such more preferred compounds are also more preferred.

Examples of very useful carboxamides ($NH_2$—CO—$R_6$) are the following ones:

| $R_6$ | Name |
|---|---|
| —$NH_2$ | Carbamide (urea) |
| —NHOH | Hydroxycarbamide (Hydroxy urea) |
| —NH($CH_3$) | N-Methyl carbamide (N-Methyl urea) |
| —N($CH_3$)$_2$ | 1,1-dimethyl carbamide (1,1-dimethyl urea) |
| —N($C_2H_5$)$_2$ | 1,1-diethyl carbamide (1,1-diethyl urea) |
| —NH—$C_6H_5$ | Phenyl carbamide (Phenyl urea) |
| —NH—$C_6H_4$—$CH_3$ | Tolylcarbamide (Tolyl urea) |
| —H | Formamide |
| —$CH_3$ | Ethanamide |
| —$C_2H_5$ | Propionamide |
| —$OC_2H_5$ | Ethyl carbamate |
| —$OC_4H_9$ | Butyl carbamate |
| —$OC_6H_5$ | Phenyl carbamate |
| —$OCH_2$—$CH_2OH$ | Hydroxyethyl carbamate |
| —$OCH(CH_3)$—$CH_2OH$ | Hydroxypropyl carbamate |
| —$CH(CH_3)$—OH | Lactamide |
| —$C_6H_5$ | Benzamide |
|  | Nicotinamide |

Most preferably carbamide (urea) is used. It is to be noted that in calculating the number of carboxamide equivalents carbamide (urea) is regarded as containing 2 carboxamide groups.

The compound comprising an acylurea group having the structure —CO—NH—CO—NH— may be provided and/or prepared beforehand and after preparation added to a polyisocyanate composition in order to form the stable polyisocyanate composition according to the invention. The polyisocyanate used for making the acylurea compound may be identical or different from the polyisocyanate being present in the stable polyisocyanate composition.

Alternatively, the compound comprising an acylurea group having the structure —CO—NH—CO—NH— may be prepared by combining and mixing the compound comprising the carboxamide group having the structure —CO—$NH_2$ to a polyisocyanate composition and allowing them to react to form the compound having an acylurea group and to form the stable polyisocyanate composition according to the invention.

If desirable, the compound comprising the carboxamide may be dissolved in a solvent before being reacted with the polyisocyanate. The solvent may be selected from a solvent which is not reactive with NCO groups or from solvents which are reactive with NCO groups like monools, polyols. One ore more solvents may be used. Examples of solvents have been given further in this specification.

According to the invention, the reaction (the carboxamide with the polyisocyanate compound) is preferably conducted under stirring and nitrogen atmosphere. The reaction is preferably conducted at a temperature of 15 to 90° C. and preferably of 20-85° C. In general the reaction is conducted for 1 minute to 5 hours and preferably for 1 minute to 1 hour.

The polyisocyanate corresponding to the formula $R_7$—NCO used for making the acylurea compound corresponding to the formula $R_6$—CO—NH—CO—NH—$R_7$ may be identical or different to the polyisocyanate compound being present in the stable polyisocyanate composition which is used to make the curable polyisocyanate composition according to the invention.

In general, the polyisocyanate compound(s) according to the present invention may be selected from aliphatic and, preferably, aromatic polyisocyanates. Preferred aliphatic polyisocyanates are hexamethylene diisocyanate, isophorone diisocyanate, methylene dicyclohexyl diisocyanate and cyclohexane diisocyanate and preferred aromatic polyisocyanates are toluene diisocyanate, naphthalene diisocyanate, tetramethylxylene diisocyanate, phenylene diisocyanate, tolidine diisocyanate and, in particular, methylene diphenyl diisocyanate (MDI) and polyisocyanate compositions comprising methylene diphenyl diisocyanate (like so-called polymeric MDI, crude MDI, uretonimine modified MDI and prepolymers having free isocyanate groups made from MDI and polyisocyanates comprising MDI) and mixtures of such polyisocyanates. MDI and polyisocyanate compositions comprising MDI are most preferred and especially those selected from 1) a diphenylmethane diisocyanate comprising at least 35%, preferably at least 60% by weight of 4,4'-diphenylmethane diisocyanate (4,4'-MDI); 2) a carbodiimide and/or uretonimine modified variant of polyisocyanate 1), the variant having an NCO value of 20% by weight or more; 3) a urethane modified variant of polyisocyanate 1) and/or 2), the variant having an NCO value of 20% by weight or more and being the reaction product of an excess of polyisocyanate 1) and/or 2) and of a polyol having an average nominal hydroxyl functionality of 2-4 and an average molecular weight of at most 1000; 4) a diphenylmethane diisocyanate comprising a homologue comprising 3 or more isocyanate groups; 5) prepolymers having an NCO value of 5-30% by weight and being the reaction product of any one or more of polyisocyanates 1)-4) and of a polyol having an average nominal hydroxyl functionality of 2-4 and an average molecular weight of more than 1000 and up to 8000; and 6) mixtures of any of the aforementioned polyisocyanates.

Polyisocyanate 1) comprises at least 35% by weight of 4,4'-MDI. Such polyisocyanates are known in the art and include pure 4,4'-MDI and isomeric mixtures of 4,4'-MDI, 2,4'-MDI and 2,2'-MDI. It is to be noted that the amount of 2,2'-MDI in the isomeric mixtures is rather at an impurity level and in general will not exceed 2% by weight, the remainder being 4,4'-MDI and 2,4'-MDI. Polyisocyanates as these are known in the art and commercially available; for example Suprasec® MPR and 1306 ex Huntsman (Suprasec is a trademark of the Huntsman Corporation or an affiliate thereof which has been registered in one or more but not all countries).

The carbodiimide and/or uretonimine modified variants of the above polyisocyanate 1) are also known in the art and commercially available; e.g. Suprasec® 2020, ex Huntsman. Urethane modified variants of the above polyisocyanate 1) are also known in the art, see e.g. The ICI Polyurethanes Book by G. Woods 1990, $2^{nd}$ edition, pages 32-35.

Polyisocyanate 4) is also widely known and commercially available. These polyisocyanates are often called crude MDI or polymeric MDI. Examples are Suprasec® 2185, Suprasec® 5025 and Suprasec® DNR ex Huntsman.

The prepolymers (polyisocyanate 5)) are also widely known and commercially available. Examples are Suprasec® 2054 and Suprasec® 2061, both ex Huntsman.

Mixtures of the aforementioned polyisocyanates may be used as well, see e.g. The ICI Polyurethanes Book by G. Woods 1990, $2^{nd}$ edition pages 32-35. An example of such a commercially available polyisocyanate is Suprasec® 2021 ex Huntsman.

The NCO value of the stable polyisocyanate composition after addition and/or (in-situ) formation of the compound having a —CO—NH—CO— group according to the present invention may range from 10 to 48% by weight and preferably ranges from 20 to 33% by weight.

The polyisocyanate composition according to the present invention obtained after addition and/or (in-situ) formation of the compound having a —CO—NH—CO— group is stable and liquid and may be used to improve the pot-life of a curable polyisocyanate composition. Such a curable polyisocyanate composition is obtained by combining a lithium halide, a urea compound (not being an acylurea as described above) and an epoxy resin with the stable polyisocyanate composition according to the present invention.

The lithium halide used in the curable polyisocyanate composition used according to the present invention is used in an amount of 0.0001-0.04 and preferably of 0.00015-0.025 and most preferably of 0.0005-0.02 moles per isocyanate equivalent and preferably is selected from lithium chloride and lithium bromide. Lithium chloride is most preferred.

The urea compound used in the curable polyisocyanate composition used according to the present invention is used in such an amount that the number of urea+biuret equivalents is 0.0001-0.4 and preferably 0.001-0.2 and most preferably 0.001-0.05 per isocyanate equivalent. Most preferably the number of urea+biuret equivalents in the urea compound in the polyisocyanate composition per mole of lithium halide ranges of from 0.5-60 and most preferably of from 0.5-30. The urea compound should not comprise other isocyanate-reactive groups (i.e. other than urea groups). In calculating the number of urea equivalents, the urea groups in the carboxamides are not taken into account.

The urea compound used in the curable polyisocyanate composition used according to the present invention has an average molecular weight of 500-15000 and preferably of 600-10000 and most preferably of 800-8000. Such urea compounds are prepared by reacting polyisocyanates and amines (not being carboxamides having the structure R—CO—$NH_2$).

The polyisocyanates used to prepare such urea compound may be selected from the polyisocyanates mentioned above. The preferences mentioned above apply here as well. Most preferably polyisocyanates 1) and 2) and mixtures thereof are used. The polyisocyanate used to make the stable polyisocyanate composition according to the present invention and the polyisocyanate used to make the urea compound may be the same or different.

The amines used to prepare the urea compounds may be monoamines or polyamines. Preferably monoamines, optionally comprising a small amount of polyamines, are used. The average amine functionality of such mixtures preferably is at most 1.2. Most preferably only monoamines are used. Such amines preferably are primary amines.

The molecular weight of the amines is selected in such a way that once reacted with the selected polyisocyanate the molecular weight of the urea compound obtained falls within the above ranges. In general the molecular weight of the amines ranges of from 200-7500 and preferably of from 200-4500 and most preferably of from 200-3000.

The amines may be selected from those known in the art like amine-terminated hydrocarbons, polyesters, polyethers, polycaprolactones, polycarbonates, polyamides and mixtures thereof. Most preferred are amine-terminated polyoxyalkylene monoamines and more in particular polyoxyethylene polyoxypropylene monoamines. Preferably the oxypropylene content in these polyoxyalkylene monoamines is at least 50 and preferably at least 75% by weight calculated on the total weight of the monoamine molecule. Preferably the polyoxyalkylene monoamines have a monoalkyl group at the other end of the polymer chain, the alkyl group having 1-8 and preferably 1-4 carbon atoms. Such monoamines are known in the art. They are made by alkoxylating an alkylmonoalcohol having 1-8 carbon atoms and by subsequently converting the polyoxyalkylene monool into the monoamine. Such monoamines are commercially available. Examples are Jeffamine® M-600 and M-2005, both ex Huntsman (Jeffamine is a trademark of the Huntsman Corporation or an affiliate thereof which has been registered in one or more but not all countries). Mixtures of monoamines may be used as well.

In view of the above, a most preferred urea compound used in the polyisocyanate composition used according to the present invention is a urea compound obtained by reacting a methylene diphenyl diisocyanate or a polyisocyanate comprising a methylene diphenyl diisocyanate or a mixture of these polyisocyanates and a polyoxyalkylene monoamine, comprising oxypropylene groups in an amount of at least 75% by weight calculated on the total weight of the monoamine molecule and having an average molecular weight of 200-3000 and wherein the amine is a primary amine.

The polyisocyanate and the monoamine are combined and mixed and allowed to react. The reaction is exothermic and therefore does not require heating and/or catalysis, although heat and/or catalysis may be applied if this is regarded as convenient. For instance it may be convenient to pre-heat the polyisocyanate and/or the monoamine to 40-60° C. and to mix them then. After mixing, the temperature of the reacting mixture preferably is kept below 90° C. in order to avoid side reactions, like e.g. biuret formation. In order to ensure that all the amine reacts, a slight excess of polyisocyanate may be used; conducting the reaction at an index of 101-110 is preferred therefore. After at most 1 hour the reaction may be regarded as complete and the urea compound is ready for use to make the polyisocyanate composition used according to the present invention.

Since a small excess of polyisocyanate is used in preparing the urea compound and since the urea compound in a next step is added to a relatively large amount of polyisocyanate, some of the urea groups might be converted to biuret groups. By controlling the reaction temperature and the temperature of the subsequent mixing steps, such biuret formation is avoided as much as possible. In general, the number of urea groups which are converted into biuret groups is less than 25% and preferably less than 10%.

The epoxy resin used preferably is selected from any epoxy resin which is liquid at 20° C.

Examples of epoxy resins are:

I) Polyglycidyl and poly(β-methylglycidyl) esters, obtainable by reacting a compound having at least two carboxyl groups in the molecule and, respectively, epichlorohydrin and β-methylepichlorohydrin. The reaction is expediently effected in the presence of bases.

Aliphatic polycarboxylic acids can be used as the compound having at least two carboxyl groups in the molecule. Examples of such polycarboxylic acids are oxalic acid, succinic acid, glutaric acid, adipic acid, pimelic acid, suberic acid, azelaic acid and dimerized or trimerized linoleic acid.

However, cycloaliphatic polycarboxylic acids, such as, for example, tetrahydrophthalic acid, 4-methyltetrahydrophthalic acid, hexahydrophthalic acid or 4-methylhexa-hydrophthalic acid, may also be used.

Furthermore, aromatic polycarboxylic acids, such as, for example, phthalic acid, isophthalic acid or terephthalic acid, may be used.

II) Polyglycidyl or poly(β-methylglycidyl) ethers, obtainable by reacting a compound having at least two free alcoholic hydroxyl groups and/or phenolic hydroxyl groups with epichlorohydrin or β-methylepichlorohydrin under alkaline conditions or in the presence of an acidic catalyst with subsequent treatment with alkali.

The glycidyl ethers of this type are derived, for example, from acyclic alcohols, for example from ethylene glycol, diethylene glycol or higher poly(oxyethylene) glycols, propane-1,2-diol or poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol or sorbitol, and from polyepichlorohydrins. Further glycidyl ethers of this type are derived from cycloaliphatic alcohols, such as 1,4-cyclohexanedimethanol, bis(4-hydroxycyclohexyl)methane or 2,2-bis(4-hydroxycyclohexyl)propane, or from alcohols which contain aromatic groups and/or further functional groups, such as N,N-bis(2-hydroxyethyl)aniline or p,p'-bis(2-hydroxyethylamino)-diphenylmethane.

The glycidyl ethers may also be based on mononuclear phenols, such as, for example, p-tert-butylphenol, resorcinol or hydroquinone, or on polynuclear phenols, such as, for example, bis(4-hydroxyphenyl)methane, 4,4'-dihydroxybiphenyl, bis(4-hydroxyphenyl) sulphone, 1,1,2,2-tetrakis(4-hydroxyphenyl)ethane, 2,2-bis(4-hydroxyphenyl)propane or 2,2-bis(3,5-dibromo-4-hydroxyphenyl)propane.

Further suitable hydroxy compounds for the preparation of glycidyl ethers are novolaks, obtainable by condensation of aldehydes, such as formaldehyde, acetaldehyde, chloral or furfuraldehyde, with phenols or bisphenols which are unsubstituted or substituted by chlorine atoms or $C_1$-$C_9$-alkyl groups, such as, for example, phenol, 4-chlorophenol, 2-methylphenol or 4-tert-butylphenol.

III) Poly(N-glycidyl) compounds, obtainable by dehydrochlorination of the reaction products of epichlorohydrin with amines which contain at least two amine hydrogen atoms. These amines are, for example, aniline, n-butylamine, bis(4-aminophenyl)methane, m-xylylenediamine or bis(4-methylaminophenyl)methane.

The poly(N-glycidyl) compounds also include triglycidyl isocyanurate, N,N'-diglycidyl derivatives of cycloalkyleneureas, such as ethyleneurea or 1,3-propyleneurea, and diglycidyl derivatives of hydantoins, such as of 5,5-dimethylhydantoin.

IV) Poly(S-glycidyl) compounds, for example di-S-glycidyl derivatives, which are derived from dithiols, such as, for example, ethane-1,2-dithiol or bis(4-mercaptomethylphenyl) ether.

V) Cycloaliphatic epoxy resins, such as, for example, bis(2,3-epoxycyclopentyl) ether, 2,3-epoxycyclopentyl glycidyl ether, 1,2-bis(2,3-epoxycyclopentyloxy)ethane or 3,4-epoxycyclohexylmethyl-3',4'-epoxycyclohexanecarboxylate.

It is also possible to use epoxy resins in which the 1,2-epoxy groups are bonded to different hetero atoms or functional groups; these compounds include, for example, the N,N,O-triglycidyl derivative of 4-aminophenol, the glycidyl ether-glycidyl ester of salicylic acid, N-glycidyl-N'-(2-glycidyloxypropyl)-5,5-dimethylhydantoin or 2-glycidyloxy-1,3-bis(5,5-dimethyl-1-glycidylhydantoin-3-yl)propane.

Particularly preferred are those mentioned in I and II and most preferred are those mentioned in II.

If an epoxy resin is used which contains hydroxyl groups or other isocyanate-reactive hydrogens then these hydroxyl groups and hydrogens are not taken into account in calculating the index or the number of hydroxyl equivalents.

The curable polyisocyanate composition according to the present invention is made by mixing the stable polyisocyanate composition according to the present invention, the urea compound, the lithium halide, the epoxy resin and optionally further polyisocyanate in any order under ambient conditions or at elevated temperature, e.g. at 40-70° C. Preferably the lithium halide is premixed with the urea compound and optional further polyisocyanate and this mixture is subsequently added to the stable polyisocyanate and mixed. Before mixing the lithium halide and the urea compound, it may be convenient to dissolve the lithium halide in a solvent, like in an organic solvent like an alcohol, e.g.

methanol or ethanol. The dissolved lithium halide is then added to the urea compound. Subsequently the solvent may be stripped off if desired. Premixing and mixing is conducted under ambient conditions or at elevated temperature, e.g. at 40-70° C. and is done by means of normal stirring. The relative amounts of the polyisocyanate, the urea compound and the lithium halide are chosen in such a way that the final polyisocyanate composition used according to the invention has the relative amounts of isocyanate groups, urea groups and lithium halide as has been described before. Without wishing to be bound to any theory, the lithium halide is believed to be present in dissociated form, complexed with the urea group as a so-called bidentate complex. Finally the epoxy resin is added and mixed in such relative amounts that the number of epoxy equivalents per isocyanate equivalent ranges from 0.003-1 and preferably from 0.003-0.5 and most preferably from 0.005-0.25 and under the same conditions as mentioned above.

The curable composition so obtained has a good pot-life under ambient conditions. It is used to make a polyisocyanurate material preferably having a Tg (measured according to ASTM D4065) of at least 120° C. by allowing it to react at elevated temperature, preferably above 50° C. and most preferably above 80° C. Therefore the invention is further concerned with a polyisocyanurate material made by allowing a curable composition according to the present invention to react at elevated temperature and with a polyisocyanurate material obtainable by allowing a curable composition according to the present invention to react at elevated temperature and with a process for making these polyisocyanurate materials by allowing a curable composition according to the present invention to react at elevated temperature. Preferably the reaction is conducted at an index higher than 100, preferably at least 300 (e.g. in range of 300-100000) and most preferably at least 500. Preferably heat is applied in order to bring the curable composition to a temperature above 50° C. and most preferably above 80° C. Then the curable composition may cure fast (so-called snap-cure) while the temperature increases further (the reaction is exothermic).

The curable compositions according to the present invention may be used in a wide variety of composite processing methods to make a wide variety of composite materials. For example, they may be used to repair an object and in particular a pipe by applying them onto the interior and/or the exterior surface of such an object or such a pipe according to the so-called cured in place method. The curable compositions according to the present invention may be used in resin transfer moulding to produce door panels or honeycomb like structures, in vacuum assisted resin infusion to make structural automotive parts such as car bonnets or chassis rails, in filament winding to produce pressure vessels or gas tanks and in pultrusion to make glass fibre reinforced composite ladders or to produce prepregs used in printed circuit boards and in sheet and bulk moulding compounding processes. The polyisocyanurate composite materials according to the present invention may further be used in sporting goods, in high volume production of automotive parts, in train parts, aerospace, marine applications, wind power devices, window lineals, structural parts, adhesives, packaging, encapsulants and insulators.

Before curing it, the curable composition may be fed into a mould in order to give it a certain shape or into a cavity of an object in order to provide the object with a polyisocyanurate interior or onto a surface to provide such a surface with a polyisocyanurate cover or it may be used to repair an object and in particular a pipe by applying it onto the interior and/or the exterior surface of such an object or such a pipe (examples of such pipe repair have been described in U.S. Pat. Nos. 4,009,063, 4,366,012 and 4,622,196) or it may be used to bind materials as has been disclosed in WO 2007/096216.

Before the curable composition is cured, additives may be added to it or to its constituents. Examples of additives are further non-isocyanate-reactive solvents, polyols and monools, other catalysts, blowing agents, surfactants, water scavengers, like alkylorthoformate and in particular tri-isopropylorthoformate, antimicrobial agents, fire retardants, smoke suppressants, UV-stabilizers, colorants, plasticizers, internal mould release agents, rheology modifiers, wetting agents, dispersing agents and fillers.

The monool and/or polyol optionally used in the present invention preferably has an average nominal hydroxy functionality of 1-8 and an average molecular weight of 32-8000. Mixtures of monools and/or polyols may be used as well.

Examples of such monools are methanol, ethanol, propanol, butanol, phenol, cyclohexanol and hydrocarbon monools having an average molecular weight of 200-5000 like aliphatic and polyether monools. Examples of polyols are ethylene glycol, diethylene glycol, triethylene glycol, propylene glycol, dipropylene glycol, tripropylene glycol, trimethylol propane, sorbitol, sucrose, glycerol, ethanediol, propanediol, butanediol, pentanediol, hexanediol, aromatic and/or aliphatic polyols having more carbon atoms than these compounds and having a molecular weight of up to 8000, polyester polyols having an average molecular weight of 200-8000, polyether polyester polyols having an average molecular weight of 200-8000 and polyether polyols having an average molecular weight of 200-8000. Such monools and polyols are commercially available. Useful examples are Daltocel F555 and Daltocel F442, which are all polyether triols from Huntsman, Voranol P400 and Alcupol R1610, which are polyether polyols from DOW and Repsol, respectively, and Priplast 1838 and 3196 which are high molecular weight polyester polyols from Croda, and Capa 2043 polyol, a linear polyesterdiol of average MW of about 400 from Perstorp, and K-flex polyols 188 and A308 which are polyester polyols from King Industries having a MW of about 500 and 430 respectively, and aromatic polyester polyols like Stepanpol PH56 and BC180 having average molecular weights of about 2000 and 600 respectively, and Neodol 23E which is an aliphatic monool from Shell.

Most preferred are polyester and polyether polyols having an average molecular weight of 200-6000 and an average nominal functionality of 2-4.

The solvent having no isocyanate-reactive groups, which optionally may be used, preferably is an organic solvent which is liquid at 20° C. Solvents having a viscosity at 20° C. of 3000 mPa·s or less as measured according to ASTM D445-11a are regarded as liquid solvents. Most preferred are organic, liquid solvents which are able to dissolve more than 1 mg of a certain compound comprising the —CO—NH—CO— group per liter solvent at 20° C.

Those skilled in the art can easily determine whether or not an organic liquid is suitable for use as solvent in the present invention, certainly with the above guidance. Examples of suitable solvents are esters (such as ethyl acetate, propyl acetate, propylene carbonate, phthalate esters), ketones (such as acetone, methyl ethyl ketone, methyl isobutyl ketone, cyclohexanone), aliphatic hydrocarbons (such as cyclohexane, heptane), chlorinated hydrocarbons (such as chloroform, dichloromethane), aromatic solvents (such as benzene, toluene), ethers (such as dimethyl ether, diethyl ether, dioxane, tetrahydrofuran) and mixtures thereof. Most preferably solvents are selected which have a low boiling point at ambient pressure or under vacuum (then they may be stripped off from the curable composition easily). They should preferably be able to dissolve at least 10 g of carboxamide per kg of solvent. The amount of solvent may vary between wide ranges. The lower limit is determined by the desired type and amount of compound comprising the carboxamide and its solubility in the selected solvent. The upper limit is determined by considerations of convenience and cost: the less the better. Preferred amounts range of from 0 to 50 and more preferably of from 0 to 25 and most preferably of from 0 to 10% by weight on the weight of the epoxy resin composition.

If desired the polyisocyanurate material according to the present invention may be subjected to post-curing.

The invention is illustrated with the following examples.

EXAMPLES

Chemicals Used:

Jeffamine M-600 ex Huntsman: a monofunctional polyoxyethylene polyoxypropylene primary amine having a molecular weight of about 560 and an oxypropylene/oxyethylene ratio of about 9/1. In these examples referred to as M-600.

Suprasec 1306 polyisocyanate ex Huntsman: 4,4'-MDI, in these examples referred to as S1306.

Suprasec 2020 polyisocyanate ex Huntsman: a uretonimine modified polyisocyanate, in these examples indicated as S2020

Polyol 3380 ex Perstorp.: TMP initiated polyoxyethylene polyol with an OH-value of 380 mg KOH/g, Succinimide ex Sigma Carbamide (urea) 99%+ex Acros Organics 1,1-diethyl carbamide (diethyl urea) 97% ex Aldrich Polyglycol DME500 ex Clariant: PEG 500 dimethylether, in these examples indicated as DME 500

Araldite DY-T, ex Huntsman, triglycidylether of trimethylolpropane, indicated herein as DY-T.

Alcupol R1610, ex Repsol glycerol initiated polyoxypropylene polyol with an OH-value of 160 mg KOH/g Lithium chloride, anhydrous ex Acros Organics Ethanol 96%, ex Commercial Alcohols INC.

Araldite®, Suprasec® and Jeffamine® are trademarks of the Huntsman Corporation or an Affiliate thereof and are registered in one or more but not all countries.

In none of the following examples biuret formation was observed.

Examples 1-2

Preparation of Compounds Comprising a —CO—NH—CO— Group

Examples 1-2 describe the preparation of compounds having a —CO—NH—CO— group according to the invention wherein the compound having a —CO—NH—CO— group is a compound having an acylurea group having the structure —CO—NH—CO—NH— and wherein said compound is the reaction product of a polyisocyanate and a compound comprising a carboxamide group having the structure —CO—$NH_2$.

Example 1

To 90 pbw of Suprasec 2020 at 85° C. (0.64 isocyanate equivalents), 10 pbw of a solution containing 10 wt % carbamide[*] (0.033 carboxamide equivalents) in polyol 3380 was added dropwise, under stirring and nitrogen atmosphere. After 20 minutes of reaction, a clear liquid reaction product was obtained comprising the compound having an acylurea group.
[*]carbamide=urea=$NH_2$—CO—$NH_2$ Example 2

To 80 pbw of Suprasec 2020 at 85° C. (0.56 isocyante equivalents), 20 pbw of a solution containing 10 wt % 1,1-dimethyl carbamide[*] 500 (0.017 carboxamide equivalents) in DME 500 was added dropwise, under stirring and nitrogen atmosphere. After 20 minutes of reaction, a clear liquid reaction product was obtained comprising the compound having an acylurea group.
(*) 1,1 dimethyl carbamide=1,1 dimethyl urea=$NH_2$—CO—$N(CH_3)_2$ Examples 3-11

Preparation of Stable Polyisocyanate Compositions According the Invention

The compound having a —CO—NH—CO— group is added to a polyisocyante composition in order to create the stable polyisocyanate composition according to the invention.

In examples 3-8, said compound is the reaction product of a polyisocyanate and a compound comprising a carboxamide group having the structure —CO—$NH_2$ as described in examples 1-2.

In examples 9-11, said compound corresponds to succinimide.

TABLE 1

| example | S2020 amount in pbw | compound from example 1 amount in pbw | Compound from example 2 amount in pbw | 5 wt % solution of succinimide in DME 500 amount in pbw | CO—NH—CO/ isocyanate ratio |
|---|---|---|---|---|---|
| 3 | 94 | 1 | | | 0.0005 |
| 4 | 93 | 2 | | | 0.001 |
| 5 | 92 | 3 | | | 0.0015 |
| 6 | 94 | | 1 | | 0.00026 |
| 7 | 93 | | 2 | | 0.00052 |
| 8 | 92 | | 3 | | 0.00078 |
| 9 | 95 | | | 0.66 | 0.0005 |
| 10 | 95 | | | 1.32 | 0.001 |
| 11 | 95 | | | 1.98 | 0.0015 |

Example 12

Preparation of the Urea/Salt Mixture 1123.7 g Jeffamine M600, which was kept at 50° C., and 260 g S1306, which was also kept at 50° C., were mixed and allowed to react for 1 hour at 80° C. under stirring, so as to form a urea compound.

23.9 g of lithium chloride was dissolved in 125.3 g ethanol while stirring.

This lithium chloride solution was added to the above prepared urea compound which was still kept at 80° C. Stirring was continued for about 15 minutes. A substantial amount of ethanol was afterwards stripped off by distillation at 85-95° C.

Examples 13-22

Preparation of Curable Compositions and Polyisocyanurate Materials According to the Present Invention The compositions of Table 1 (example 3-11) were mixed with 5 pbw of the urea/salt mixture prepared in example 12, 4 pbw of an epoxy resin Araldite DY-T and 15 pbw of polyol Alcupol R1610 for 5 minutes. 100 g of these curable composition was poured in a glass jar of 120 ml and closed with a screw lid and placed at room temperature in order to determine the pot-life by following the temperature profile with a thermocouple placed in the liquid resin till the onset (30° C.) of the temperature rise. 100 g of these curable compositions were allowed to cure in an 4 mm thick aluminium closed mould for 1 hour at 120° C., so as to prepare polyurethane polyisocyanurate materials according to the present invention.

The glass transition temperature (Tg) from the obtained materials was determined by Differential Mechanical Thermo Analysis (DMTA) on a TA Q800 apparatus with a heating rate of 3° C./min and a frequency of 1 Hz (measured according to ASTM D 4065). The Tg was defined as the first inflection point on the E' (storage modulus) curve determined by the TA Universal analysis software.

A reference material not according the invention without the presence of a compound having the —CO—NH—CO— group was prepared with the same procedure (example 13).

The ingredients used, the amounts in parts by weight, the pot-lives, Tg of the cured materials, the equivalent ratio of —CO—NH—CO— group per isocyanate, equivalent ratio Urea+biuret per isocyanate, equivalent ratio LiCl per isocyanate, equivalent ratio epoxy per isocyante, equivalent ratio urea+biuret per lithium chloride of the compositions are given in Table 2.

The ingredients used, the amounts in parts by weight, the pot-lives, Tg of the cured materials, the equivalent ratio of —CO—NH—CO— group per isocyanate, equivalent ratio Urea+biuret per isocyanate, equivalent ratio LiCl per isocyanate, equivalent ratio epoxy per isocyanate, equivalent ratio urea+biuret per lithium chloride of the compositions are given in Table 2.

Figure 1:
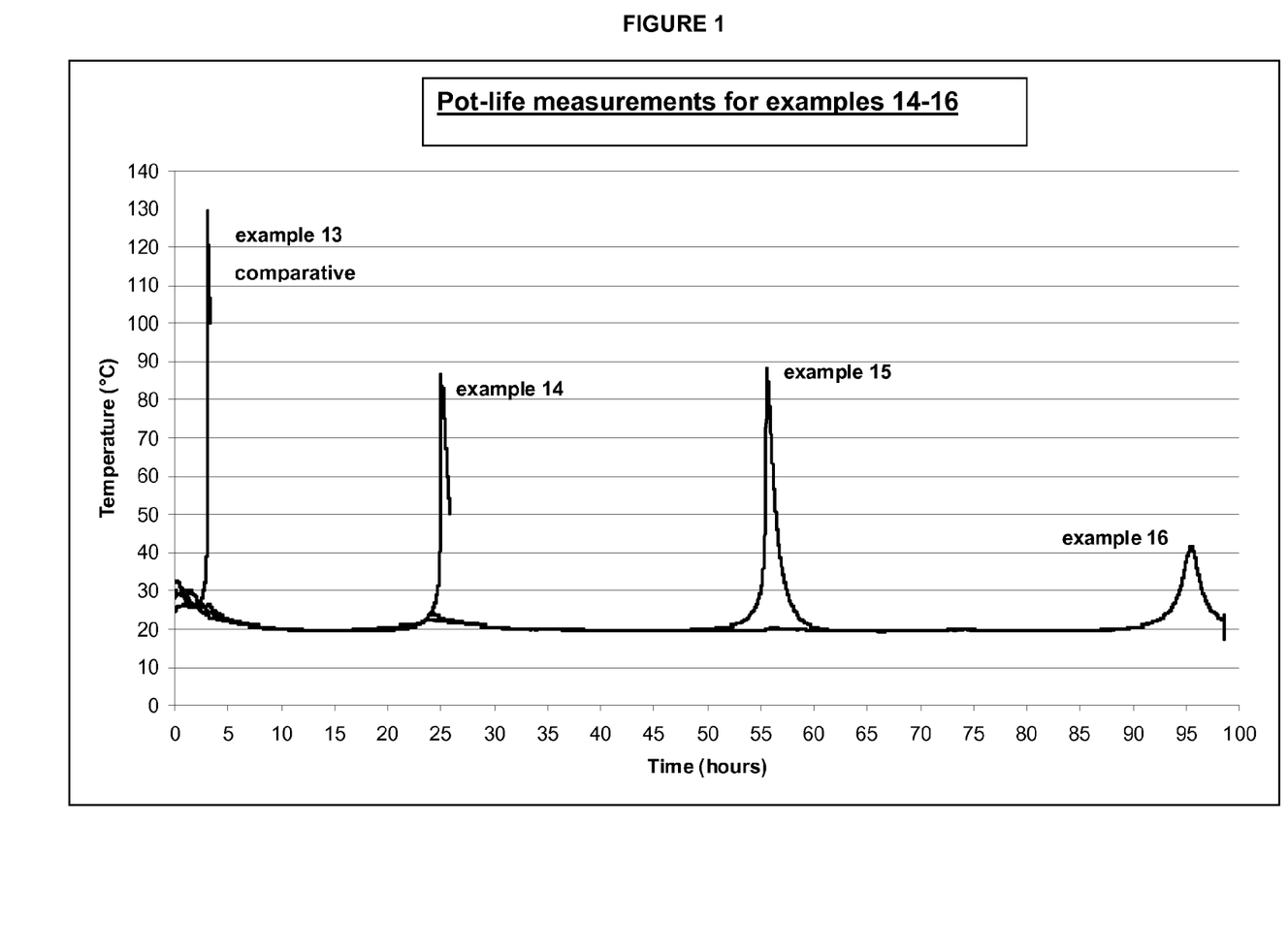
Figure 2:
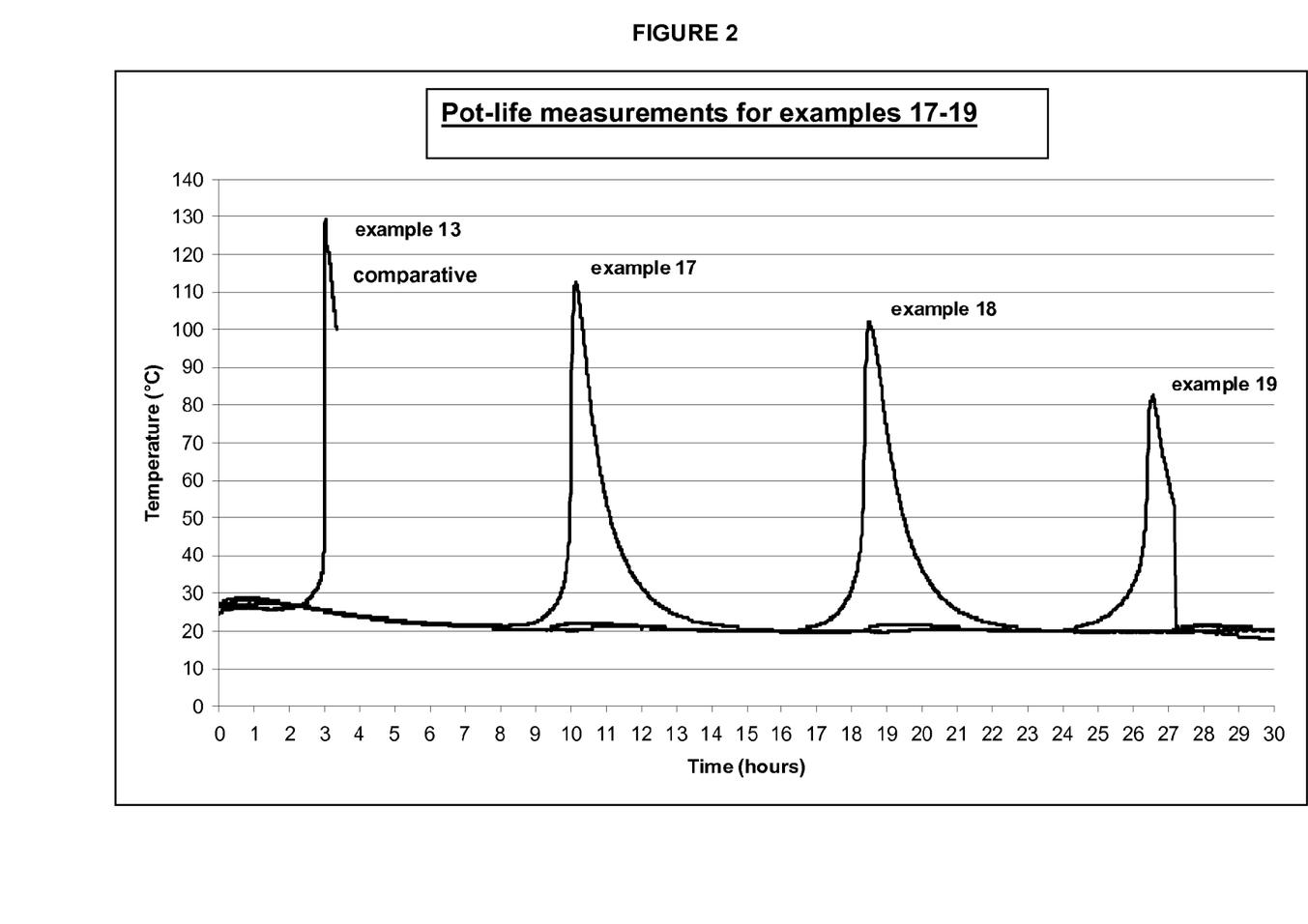
Figure 3:
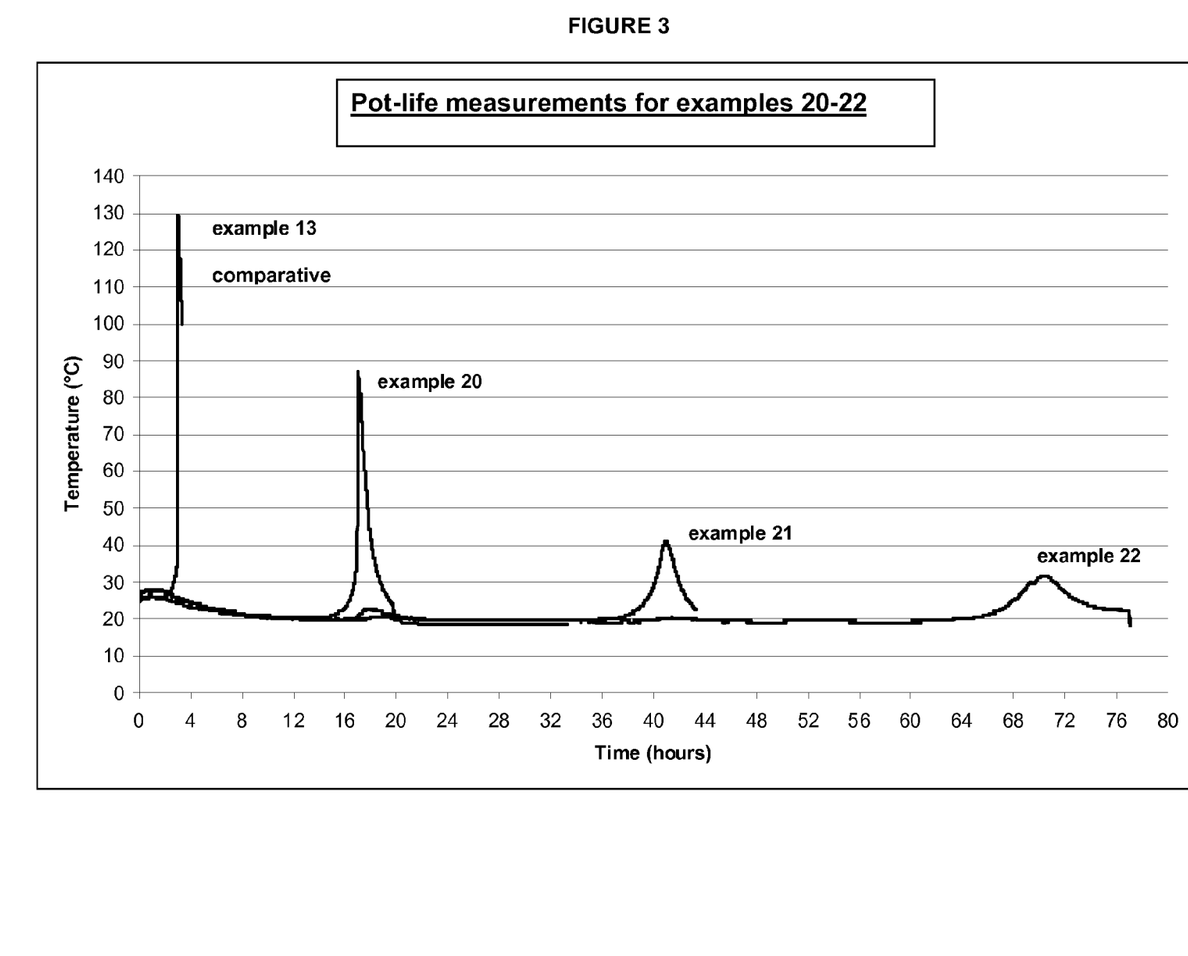

FIGS. 1-3 illustrate the pot-life measurements of the cured material according to the invention (examples 14-22) with significantly improved pot-lives compared to the comparative example 13.

The invention claimed is:

1. A curable composition for making a polyisocyanurate material by allowing the curable composition to react at elevated temperature above 50° C. comprising:
  a polyisocyanate composition comprising a compound comprising a group having the structure —CO—NH—CO— in such an amount that the ratio of the number of —CO—NH—CO— groups to the number of isocyanate groups is at most 1, and
  a lithium halide, and
  a urea compound, having an average molecular weight of 500-15000 and optionally comprising biuret groups, and
  an epoxy resin,
wherein the number of moles of lithium halide per isocyanate equivalent ranges from 0.0001-0.04 and the number of urea+biuret equivalents per isocyanate equivalent ranges from 0.0001-0.4 and the number of epoxy equivalents per isocyanate equivalent ranges from 0.003-1; and wherein the curable composition is stable up to 40° C.

2. The curable composition according to claim 1, wherein the polyisocyanate composition has an amount of isocyanate functional groups of 10 to 48% by weight.

3. The curable composition according to claim 1, wherein the compound comprising a group having the structure —CO—NH—CO— corresponds to the structure $R_1$—CO—NH—CO—$R_2$ wherein $R_1$ and $R_2$ each independently from each other are selected from 1) hydrogen (—H), 2) —$NR_3R_4$, 3) hydrocarbyl having 1-100 carbon atoms and optionally comprising hydroxy, ether, halogen, carboxyl, oxygen, isocyanate and/or amine groups wherein $R_3$ and $R_4$ independently from each other, are selected from hydrogen, hydroxy, halogen and hydrocarbyl groups which hydrocarbyl groups have 1-20 carbon atoms and optionally comprise hydroxy, ether, halogen, carboxyl, isocyanate and/or amine groups, wherein $R_1$ and $R_2$ may be linked to each other essentially forming a ring structure including the —CO—NH—CO— group, and wherein the hydrocarbyl groups in the compounds corresponding to the formula $R_1$—CO—NH—CO—$R_2$ may be a combination of linear, branched, saturated, unsaturated, cyclic and/or non-cyclic aliphatic, aromatic or aralifatic hydrocarbyls and mixtures of such compounds.

4. The curable composition according to claim 3, wherein $R_1$ and $R_2$ together with the —CO—NH—CO— group form a 4 to 12 membered ring structure including the —CO—NH—CO— group.

5. The curable composition according to claim 1, wherein the compound comprising a group having the structure —CO—NH—CO— corresponds to a compound comprising a —CO—NH—CO—NH— group which is a reaction product of a compound comprising a carboxamide group having the structure —CO—$NH_2$ and an isocyanate compound comprising a reactive NCO group.

6. The curable composition according to claim 1, wherein the compound comprising a group having the structure —CO—NH—CO— corresponds to $R_6$—CO—NH—CO—NH—$R_7$ and wherein the compound is the reaction product of a compound comprising a carboxamide and a compound comprising a reactive NCO group
  wherein the compound comprising a carboxamide group corresponds to $NH_2$—CO—$R_6$ and wherein $R_6$ is 1) hydrogen (—H), 2) —$NR_8R_9$, 3) hydrocarbyl having 1-20 carbon atoms and optionally comprising hydroxy, ether, halogen and/or amine groups, or 4) —$R_{10}$—CO—$NH_2$, wherein $R_8$ and $R_9$, independently from each other, are selected from hydrogen, hydroxy, halogen and hydrocarbyl groups which hydrocarbyl groups have 1-10 carbon atoms and optionally comprise hydroxy, ether, halogen and/or amine groups and wherein $R_{10}$ is a bivalent hydrocarbon radical having up to 8 carbon atoms and mixtures of these carboxamides, and
  wherein the compound comprising a reactive NCO group corresponds to $R_7$—NCO and wherein $R_7$ is selected

TABLE 2

| example | S2020 amount in pbw | compositions from Table 1 example/amount in pbw | Pot-life of the curable composition (hours) | Tg cured material (° C.) | Equivalent ratio —CO—NH—CO—/isocyanate | Equivalent ratio Urea + biuret/Isocyanate | Equivalent ratio LiCl/isocyanate | Equivalent ratio Epoxy/isocyanate | Equivalent ratio Urea + biuret/LiCl |
|---|---|---|---|---|---|---|---|---|---|
| 13 | 95 | 0 | 2.7 | 145 | 0 | 0.0109 | 0.003 | 0.0480 | 3.65 |
| 14 | 0 | 3/95 | 24.7 | 152 | 0.0005 | 0.0110 | 0.003 | 0.0481 | 3.65 |
| 15 | 0 | 4/95 | 55 | 156 | 0.001 | 0.0110 | 0.003 | 0.0482 | 3.65 |
| 16 | 0 | 5/95 | 94 | 152 | 0.0015 | 0.0110 | 0.003 | 0.0484 | 3.65 |
| 17 | 0 | 6/95 | 9.7 | 151 | 0.00026 | 0.0110 | 0.003 | 0.0481 | 3.65 |
| 18 | 0 | 7/95 | 18 | 167 | 0.00052 | 0.0110 | 0.003 | 0.0482 | 3.65 |
| 19 | 0 | 8/95 | 25.9 | 161 | 0.00078 | 0.0110 | 0.003 | 0.0483 | 3.65 |
| 20 | 0 | 9/95.66 | 16.7 | 154 | 0.0005 | 0.0109 | 0.003 | 0.0480 | 3.65 |
| 21 | 0 | 10/96.32 | 40 | 149 | 0.001 | 0.0109 | 0.003 | 0.0480 | 3.65 |
| 22 | 0 | 11/96.98 | 69.7 | 150 | 0.0015 | 0.0109 | 0.003 | 0.0480 | 3.65 | from hydrogen and hydrocarbyl groups which hydrocarbyl groups have 1-20 carbon atoms and optionally comprise hydroxy, ether, halogen, carboxyl, isocyanate and/or amine groups and wherein said hydrocarbyl groups may be a combination of linear, branched, saturated, unsaturated, cyclic and/or non-cyclic aliphatic, aromatic or araliphatic hydrocarbyls and mixtures of such compounds.

7. The curable composition according to claim 1, wherein the compound comprising a —CO—NH—CO— group corresponds to $R_6$—CO—NH—CO—NH—$R_7$ which is made by adding a compound comprising a carboxamide group having the structure $R_6$—CO—NH$_2$ to a polyisocyanate corresponding to the formula $R_7$—NCO and allowing the mixture to react in order to form the compound corresponding to $R_6$—CO—NH—CO—NH—$R_7$ wherein $R_6$ is 1) hydrogen, 2) —$NR_8R_9$, 3) hydrocarbyl having 1-20 carbon atoms and optionally comprising hydroxy, ether, halogen and/or amine groups, or 4) —$R_{10}$—CO—NH$_2$, wherein $R_8$ and $R_9$, independently from each other, are selected from hydrogen, hydroxy, halogen and hydrocarbyl groups which hydrocarbyl groups have 1-10 carbon atoms and optionally comprise hydroxy, ether, halogen and/or amine groups and wherein $R_{10}$ is a bivalent hydrocarbon radical having up to 8 carbon atoms and $R_7$ may be selected from hydrogen and hydrocarbyl groups which hydrocarbyl groups have 1-20 carbon atoms and optionally comprise hydroxy, ether, halogen, carboxyl, isocyanate and/or amine groups and wherein said hydrocarbyl groups may be a combination of linear, branched, saturated, unsaturated, cyclic and/or non-cyclic aliphatic, aromatic or araliphatic hydrocarbyls and mixtures of such compounds.

8. The curable composition according to claim 7, wherein $R_6$ is selected from 1) —$NR_8R_9$, 2) alkyl having 1-10 carbon atoms and optionally comprising 1-3 hydroxy and/or ether groups, 3) phenyl or 4) tolyl wherein $R_8$ and $R_9$, independently from each other, are selected from hydrogen, hydroxy, phenyl, tolyl and alkyl having 1-6 carbon atoms and optionally comprising an hydroxy and/or an ether and mixtures of such compounds.

9. The curable composition according to claim 1, wherein the urea compound does not comprise other isocyanate-reactive groups than urea groups and wherein the number of urea+biuret equivalents per isocyanate equivalent is 0.001-0.2 and wherein the urea compound has been prepared by reacting a methylene diphenyl diisocyanate or a polyisocyanate comprising a methylene diphenyl diisocyanate or a mixture of these polyisocyanates with a polyoxyalkylene monoamine comprising oxypropylene groups in an amount of at least 50% by weight calculated on the total weight of the monoamine molecule and having an average molecular weight of 200-3000 and wherein the amine is a primary amine and wherein the number of urea+biuret equivalents per mole of lithium halide is 0.5-60.

10. The curable composition according to claim 1, wherein the composition comprises a toluene diisocyanate, a methylene diphenyl diisocyanate or a polyisocyanate composition comprising a methylene diphenyl diisocyanate or a mixture of such polyisocyanates.

11. The curable composition according to claim 1, wherein the amount of lithium halide is 0.00015-0.025 moles per isocyanate equivalent.

12. The curable composition according to claim 1, wherein the lithium halide is lithium chloride.

13. A process for making a polyisocyanurate material comprising: allowing the curable composition according to claim 1 to react at a temperature above 50° C.

14. The process according to claim 13, wherein the reactive mixture is reacted at a temperature above 80° C.

15. The process according to claim 13, wherein the ratio of the number of —CO—NH—CO— groups to the number of isocyanate groups is at most 0.01.

16. The process according to claim 13, wherein the ratio of the number of —CO—NH—CO— groups to the number of isocyanate groups is at most 0.0015.

17. The curable composition according to claim 1, wherein the ratio of the number of —CO—NH—CO— groups to the number of isocyanate groups is at most 0.01.

18. The curable composition according to claim 1, wherein the ratio of the number of —CO—NH—CO— groups to the number of isocyanate groups is at most 0.0015.

* * * * *